United States Patent
Garrison

Patent Number: 5,428,918
Date of Patent: Jul. 4, 1995

[54] FISHING LURE HAVING A LOCKING COLLAR

[76] Inventor: William B. Garrison, 4689 N. Monroe St., Tallahassee, Fla. 32303

[21] Appl. No.: 201,634

[22] Filed: Feb. 25, 1994

[51] Int. Cl.⁶ ............................................. A01K 85/00
[52] U.S. Cl. .................... 43/42.28; 43/42.37; 43/42.24
[58] Field of Search ............... 43/42.24, 42.33, 42.28, 43/42.1, 42.29, 42.41, 42.37, 42.38

[56] References Cited

U.S. PATENT DOCUMENTS

| | | | |
|---|---|---|---|
| 2,979,850 | 4/1961 | Lund | 43/42.24 |
| 3,147,564 | 9/1964 | Messler | 43/42.24 |
| 3,367,060 | 2/1968 | Abercrombie | 43/42.33 |
| 3,380,184 | 4/1968 | Fernandez | 43/42.24 |
| 3,863,378 | 2/1975 | Walker | 43/42.37 |
| 4,367,607 | 1/1983 | Hedman | 43/42.24 |
| 4,791,749 | 12/1988 | Stazo | 43/42.24 |
| 5,301,453 | 4/1994 | Terrill | 43/42.24 |

FOREIGN PATENT DOCUMENTS

0004879 of 1897 United Kingdom ............... 43/42.24

*Primary Examiner*—P. Austin Bradley
*Assistant Examiner*—James Miner
*Attorney, Agent, or Firm*—Carnes, Cona & Dixon

[57] ABSTRACT

A fishing lure is provided with a head, tail, and body. Located between the head and the body, and encircling the fishing lure, is a locking collar. This locking collar maintains a jighead in a secured position. By doing so, the life span of the fishing lure is increased. A guide hole is located in the head and extends to the front portion of the body in order to guide the hook of the jighead.

5 Claims, 16 Drawing Sheets

FISHING LURE HAVING A LOCKING COLLAR

BACKGROUND OF THE INVENTION

Fishing is a major pastime in the United States. People fish in oceans, lakes, streams and just about any other body of water. Many fisherman prefer to use a manmade lure, as opposed to live bait, in order to catch their fish. Lure provide many advantages and are very convenient. Lures can be made in all types of shapes, sizes, colors, and styles. Lures can also be reused.

One problem associated with the use of lures is encountered when a fish bites on the lure. The tendency is for the lure to slip down off of the jighead. Not only will the fish get away, but the lure may be ruined. A similar problem is encountered when a lure is dragged along the bottom surface of a body of water.

What is needed is a lure where the jighead will remain stationary despite a fish being on the line or the lure is being dragged long a bottom surface. Such a lure must maintain the versatility of present-day lures. The cost to manufacture such a lure must be in line with the costs of present day lures.

SUMMARY OF THE INVENTION

The present invention provides for fishing lures that imitate the appearance and texture of live fish. In doing so, the fishing lures of the present invention are provided with a body, head, tail, guide hole and a collar.

The guide hole is internally located in the head and extends to the body. This guide hole receives and directs the hook of the jighead. The collar is a circular hollow tube that is placed on the fishing lure between the body and head. The location and configuration of the guide hole and collar secures and maintains the jighead in the fishing lure.

Therefore, it is the object of the present invention to provide for fishing lures that have a life-like appearance.

It is another object of the present invention to provide for a fishing lure that attracts and appeals to various fish.

It is another object of the present invention to provide a fishing lure with an unique configuration and design in order to maintain the jighead within the lure.

It is a final object of the present invention to provide a fishing lure that is easy to use, economical to fabricate, and durable in operation.

BRIEF DESCRIPTION OF THE DRAWINGS

Similar reference numerals refer to similar parts throughout the several views of the drawings.

DESCRIPTION OF THE PREFERRED EMBODIMENTS

As illustrated in FIGS. 1-16, the fishing lures 10 of the present invention each have common features and are fabricated to attract and allure the various fish in lakes, rivers, streams, oceans and other bodies of water.

In order for each fishing lure 10 to appear more life-like, realistic, and appealing to the fish sought after by a fisherman, the lures 10 of the present invention are each molded and constructed to have a body 12, a head 14, and a tail 16. The body, head, and tail form a homogeneous object.

The body of each fishing lure is elongated and is produced from a soft pliable plastic. The body has a front portion 20 and a back portion 22. Attached to the front portion 20 is the head 14. Secured to the back portion 22 is the tail 16.

The body 12 of the fishing lure 10 can also include a variety of ridges 24, as illustrated in FIGS. 1, 2, 3, 7, 9, 10, 12, 13, and 15. The use of ridges 24 induces a turbulent flow in the water within the vicinity of the lure as the lure is pulled through the water. This flow causes the fishing lure to oscillate and move (stimulating a jiggling effect). This jiggling effect gives the fishing lure a realistic appearance, action, and movement of live bait, thereby attracting fish.

Figure 14A:
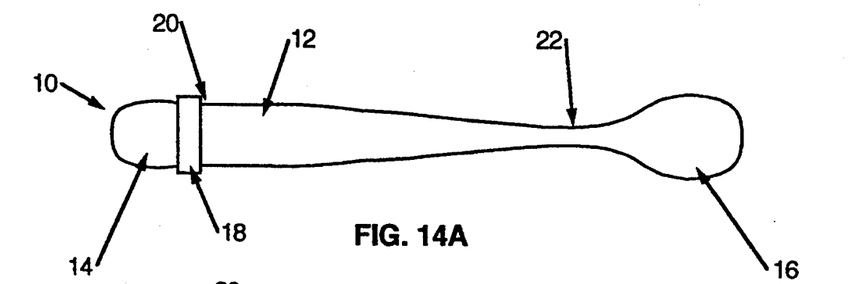
FIGS. 14a-14c are various views of a fishing lure according to the present invention formed as a soft plastic shad.
Figure 14B:
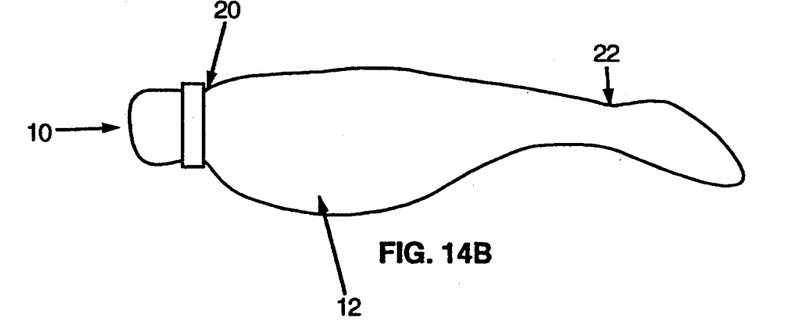
Figure 14C:
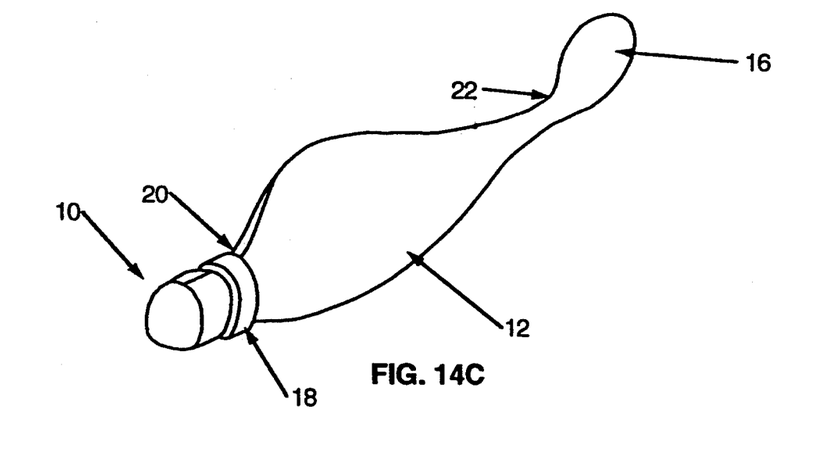
Figure 15A:
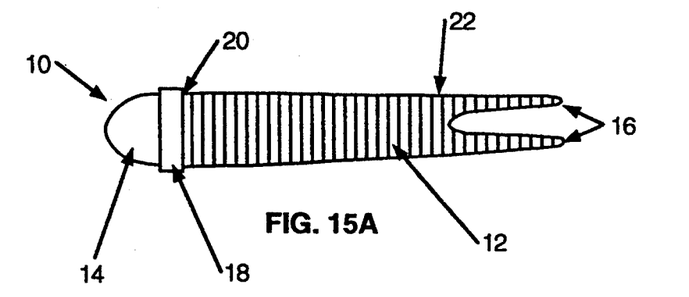
FIGS. 15a-15c are various views of a fishing lure according to the present invention formed as a soft plastic split tail grub.
Figure 15B:
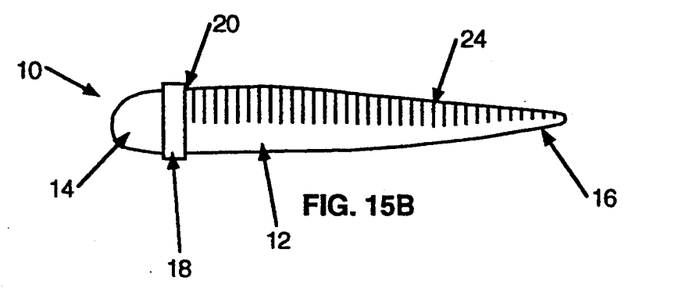
Figure 15C:
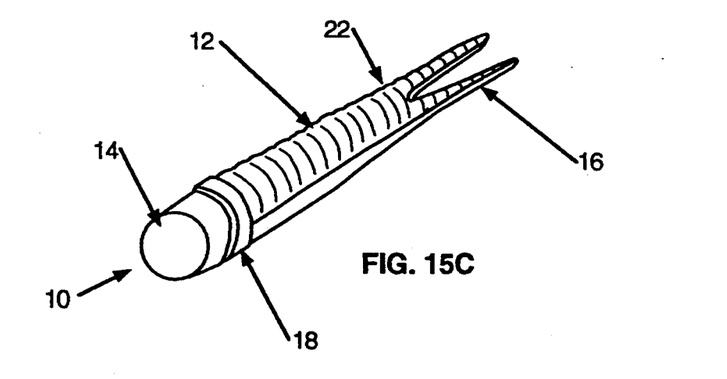

The soft plastic used for the body 12 of the fishing lures 10 can be constructed from a variety of colors, such as, but not limited to, pearl, white, yellow, pink, hot pink, clear, gold, chartreuse, amber, strawberry, red, lime, blue, black or a combination thereof. For example, in FIG. 14, the top half of the body can be blue and the bottom half can be pearl.

Figure 1A:
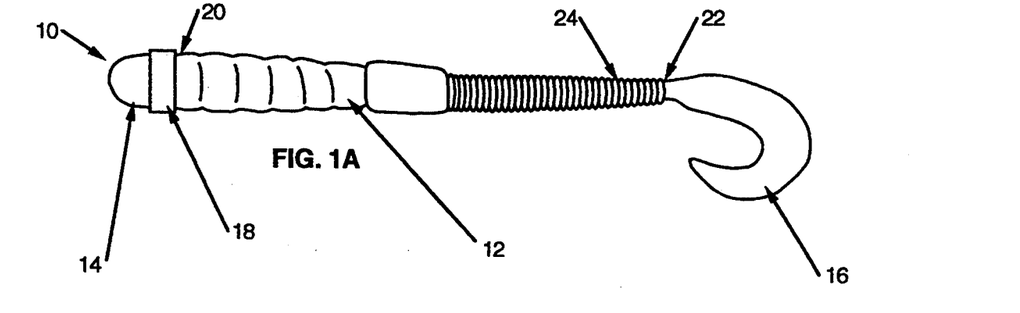
FIGS. 1a-1c are various views of a fishing lure according to the present invention formed as a soft plastic worm.
Figure 1B:
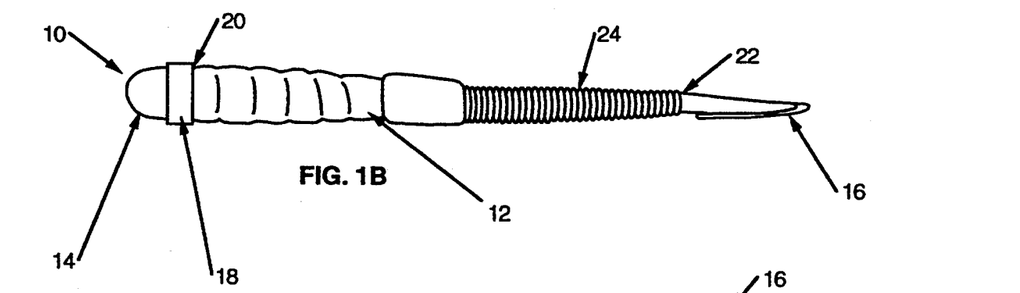
Figure 1C:
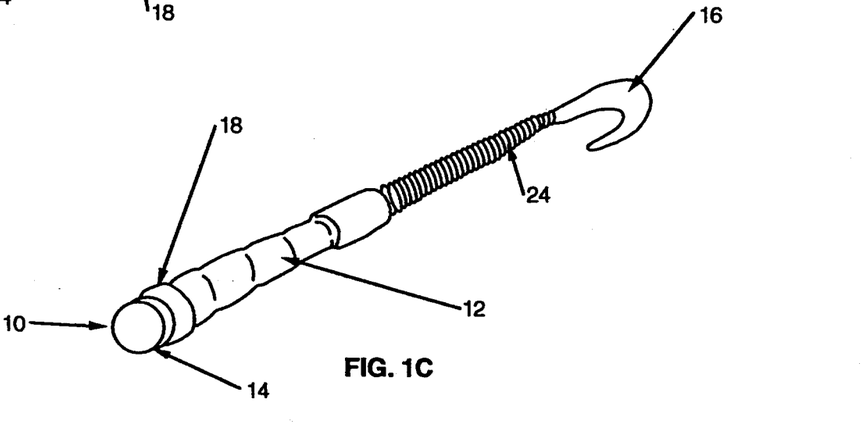
Figure 2A:
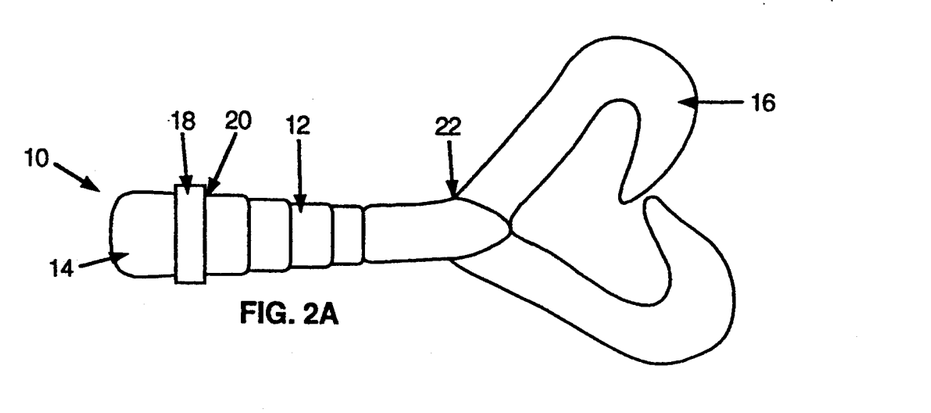
FIGS. 2a-2c are various views another fishing lure according to the present invention formed as a soft plastic twin tail.
Figure 2B:
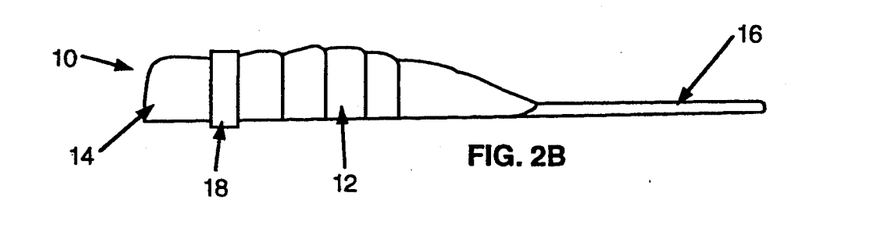
Figure 2C:
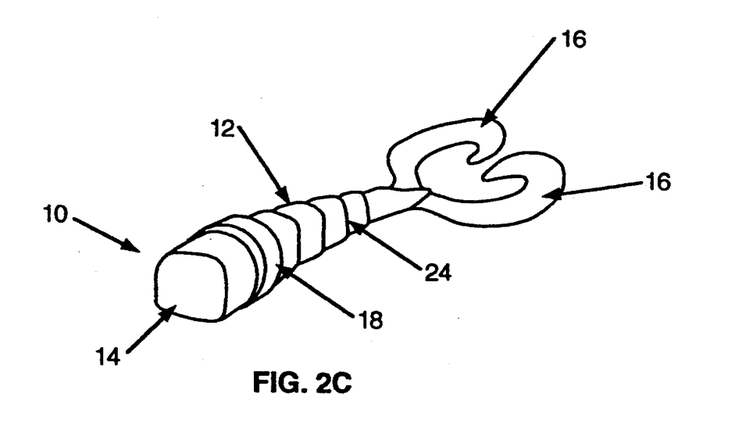
Figure 3A:
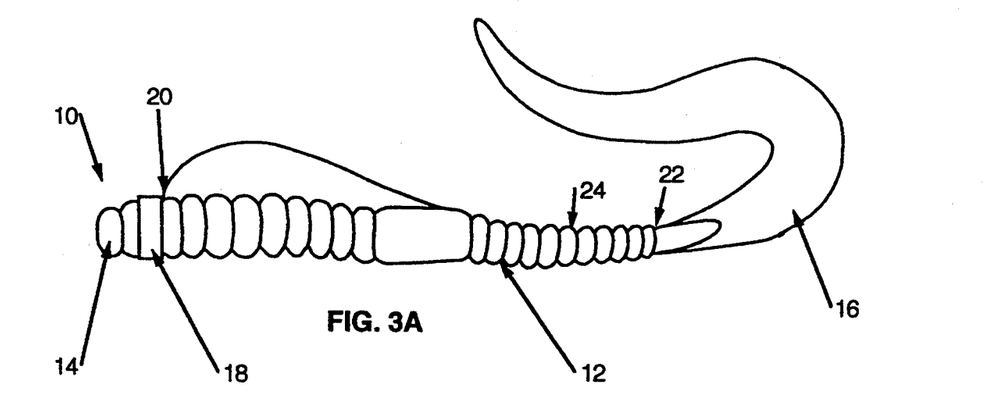
FIGS. 3a-3c are various views of the third embodiment of a fishing lure according to the present invention formed as the second embodiment of a soft plastic worm.
Figures 3B, 3C:
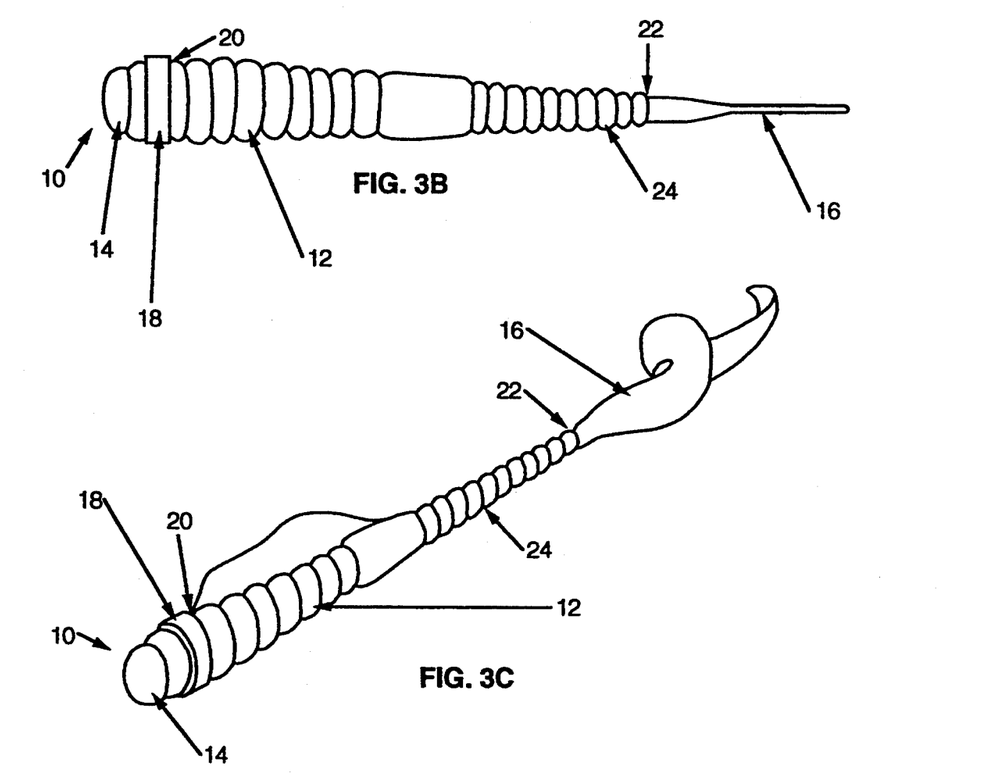
Figures 4A, 4B:
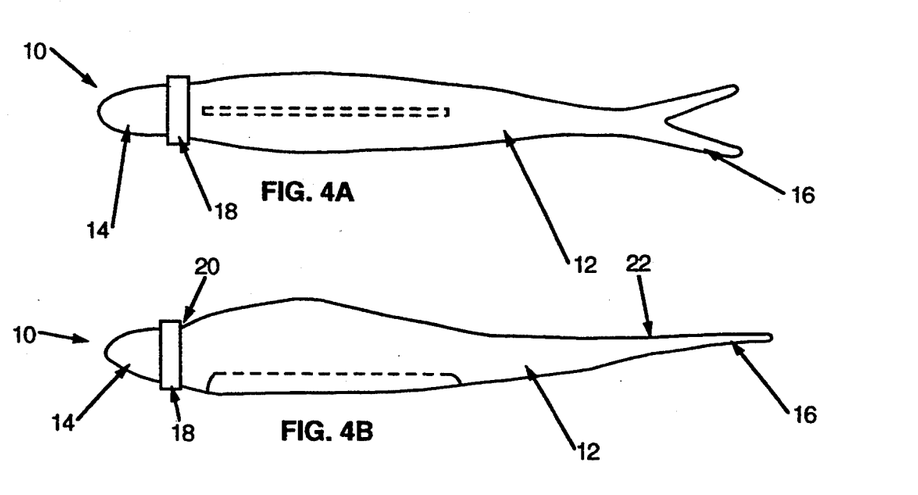
FIGS. 4a-4c are various views of a fishing lure according to the present invention formed as the first embodiment of a soft plastic jerk bait.
Figure 4C:
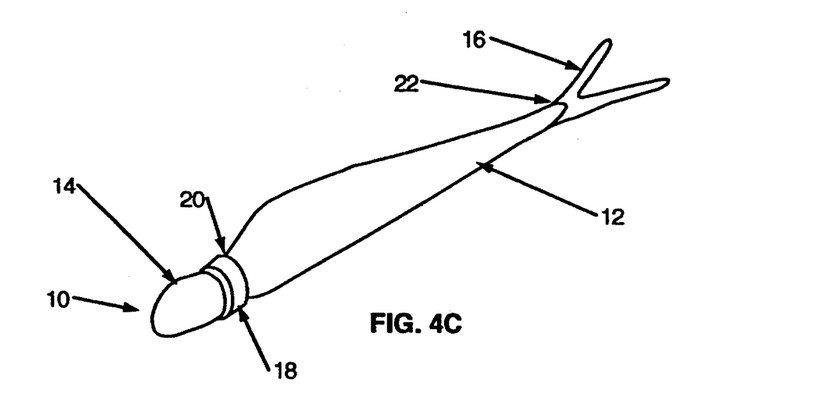
Figure 5A:
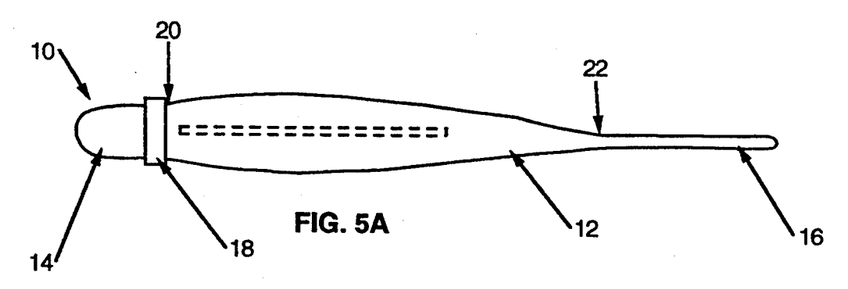
FIGS. 5a-5c are various views of a fishing lure according to the present invention formed as the second embodiment of a soft plastic jerk bait.
Figure 5B:
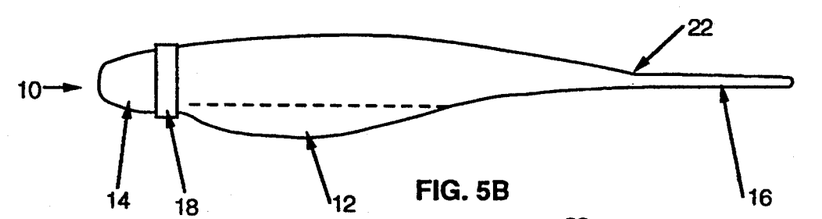
Figure 5C:
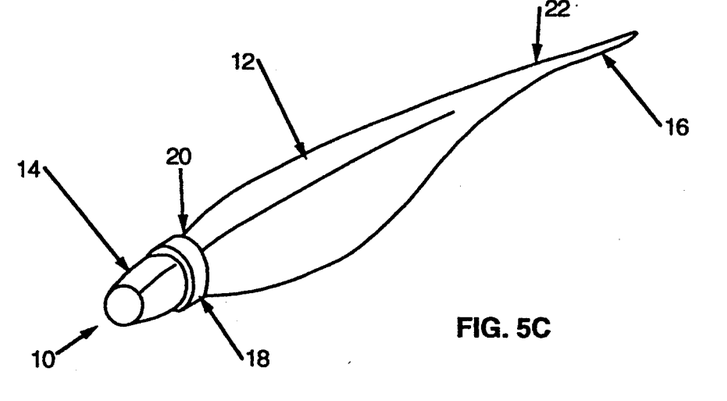
Figure 6A:
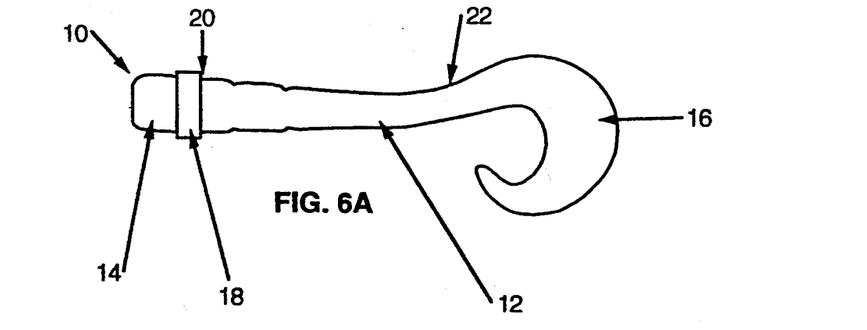
FIGS. 6a-6c are various views of a fishing lure according to the present invention formed as the first embodiment of a curl tail.
Figure 6B:
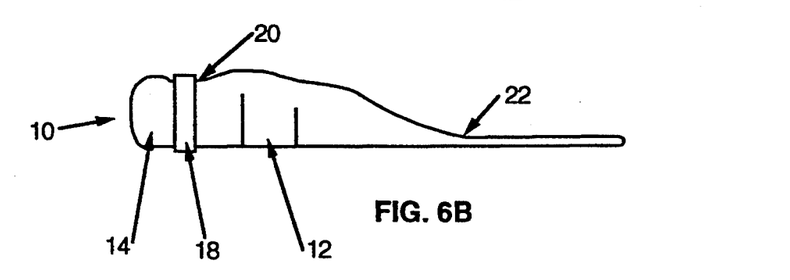
Figure 6C:
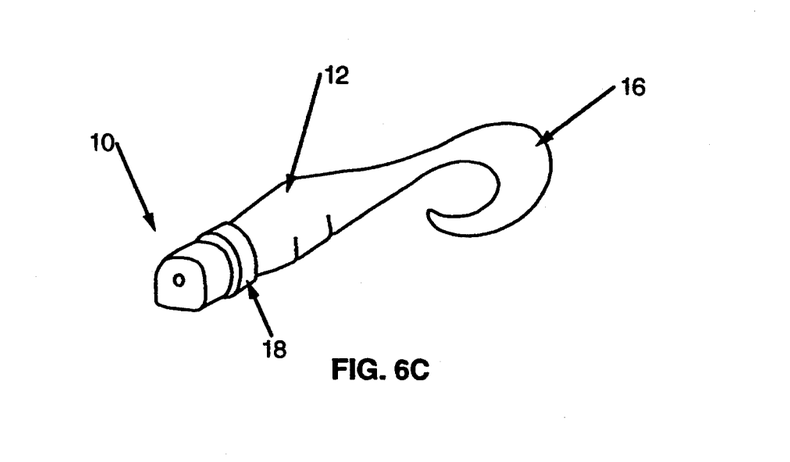
Figure 7A:
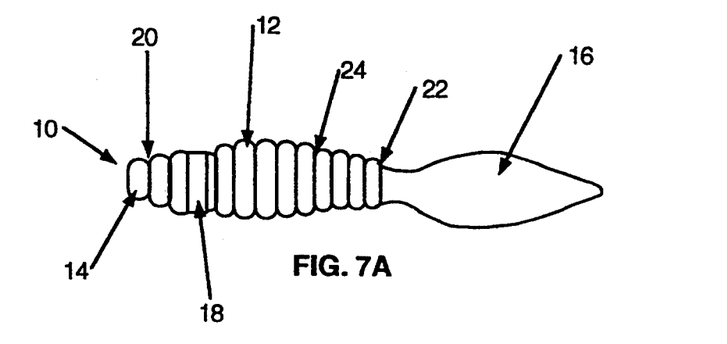
FIGS. 7a-7c are various views of a fishing lure according to the present invention formed as a soft plastic grub.
Figure 7B:
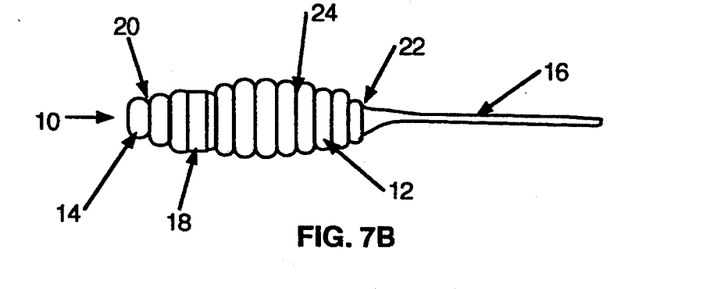
Figure 7C:
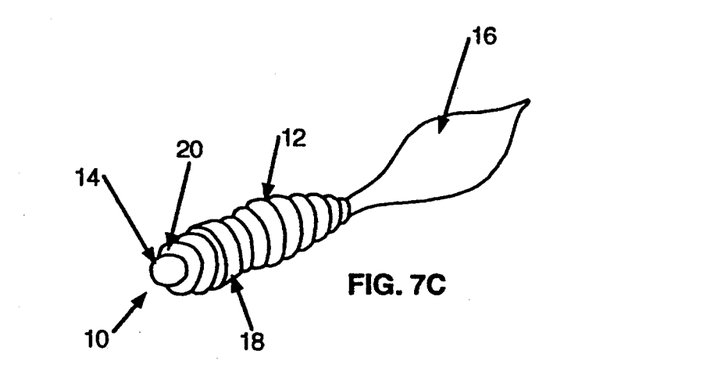

Additionally, a plurality of metal flakes can be embedded in the body. For example, in FIG. 7, the body can be chartreuse and have a plurality of metal flakes imbedded within the body. These metal flakes will reflect the available light, thereby bringing attention to the fishing lures.

Figure 8A:
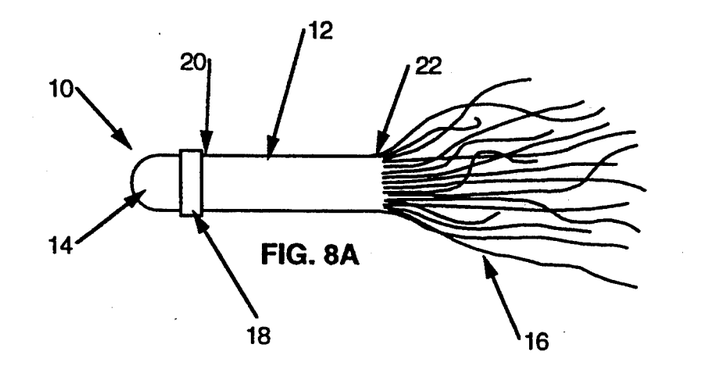
FIGS. 8a and 8b are various views of a fishing lure according to the present invention formed as a soft plastic tube lure.
Figure 8B:
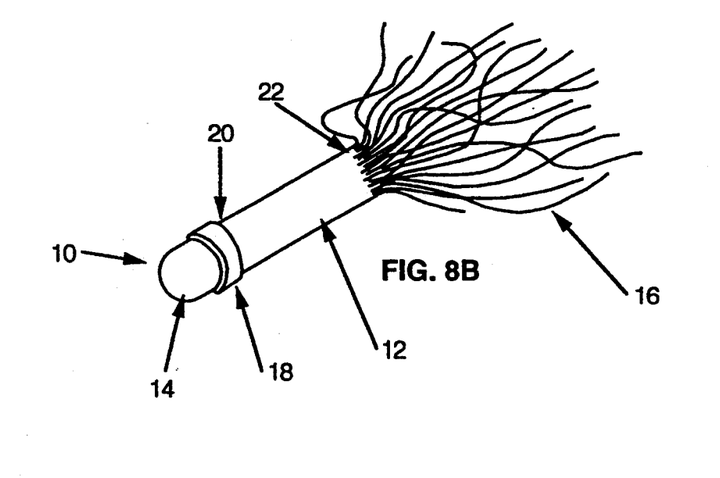
Figure 9A:
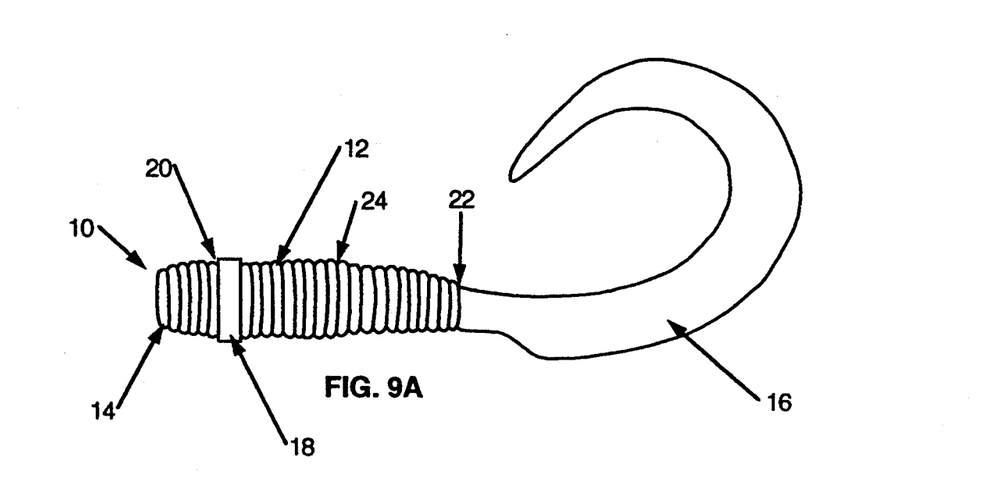
FIGS. 9a-9c are various views of a fishing lure according to the present invention formed as the second embodiment of a soft plastic curl tail.
Figure 9B:
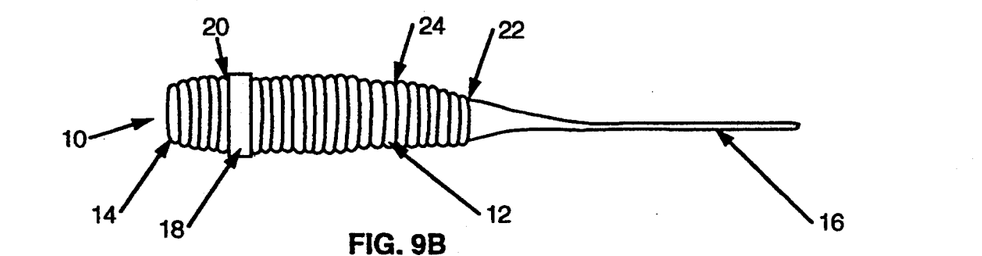
Figure 9C:
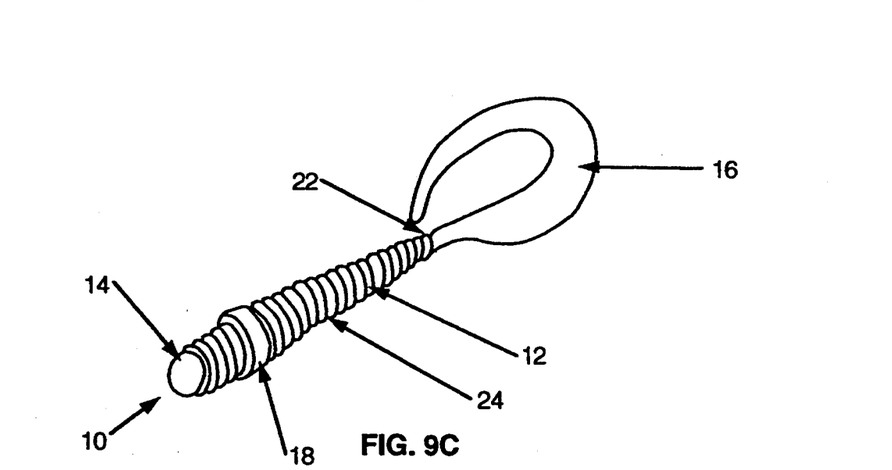
Figure 10A:
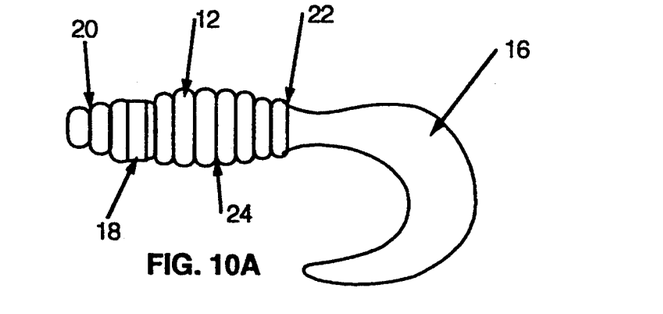
FIGS. 10a-10c are various views of a fishing lure according to the present invention formed as the third embodiment of a soft plastic curl tail.
Figure 10B:
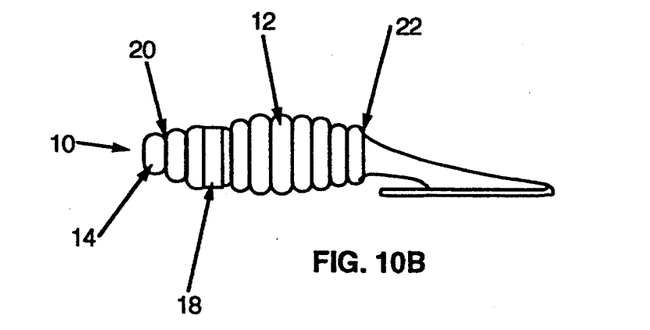
Figure 10C:
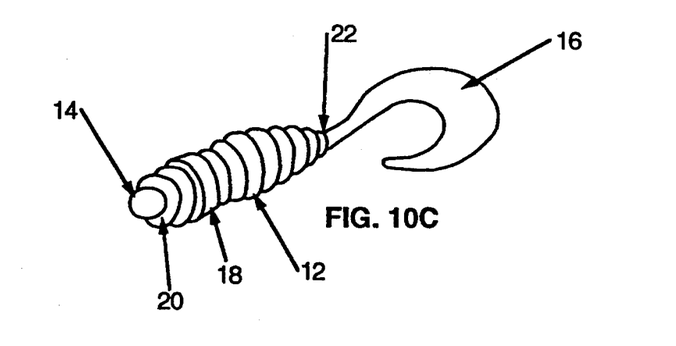
Figure 11A:
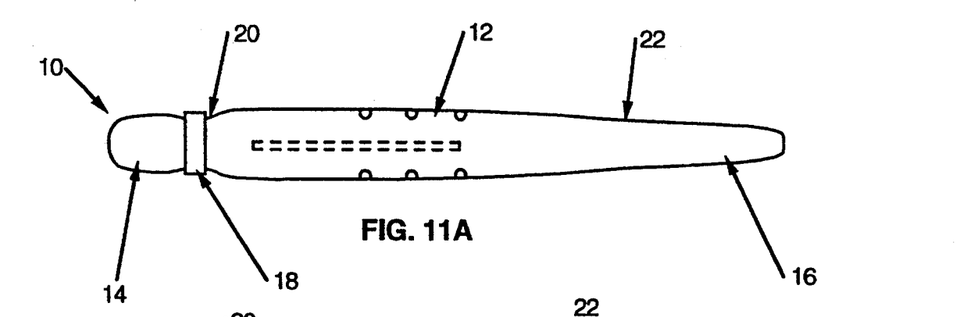
FIGS. 11a-11c are various views of a fishing lure according to the present Invention formed as the third embodiment a soft plastic jerk bait.
Figure 11B:
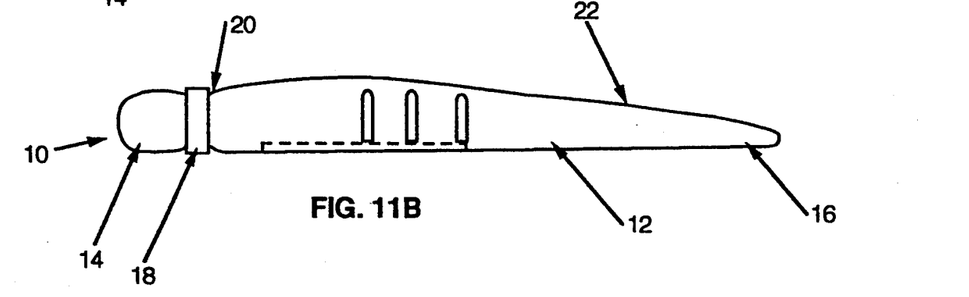
Figure 11C:
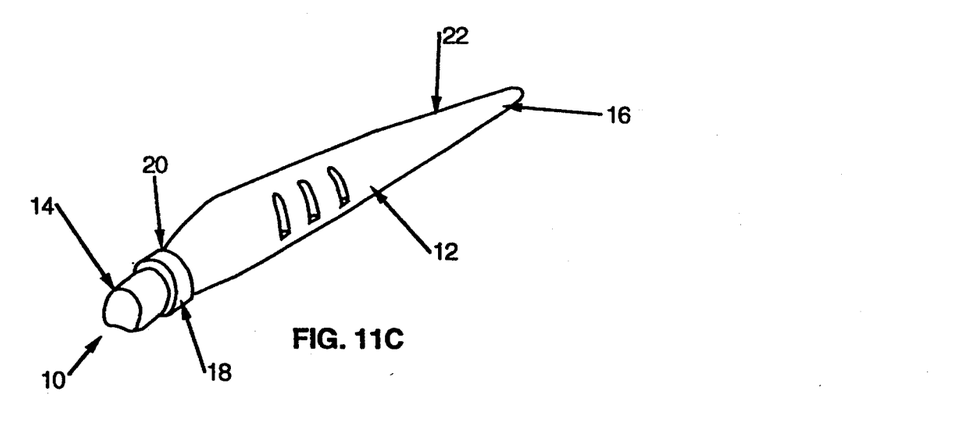
Figure 12A:
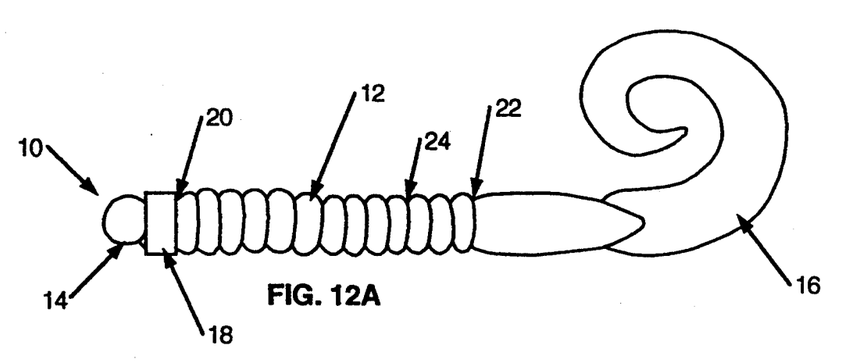
FIGS. 12a-12c are various views of a fishing lure according to the present invention formed as the fourth embodiment of a soft plastic curl tail.
Figure 12B:
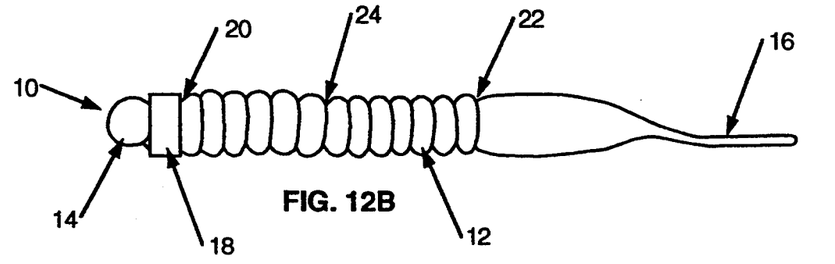
Figure 12C:
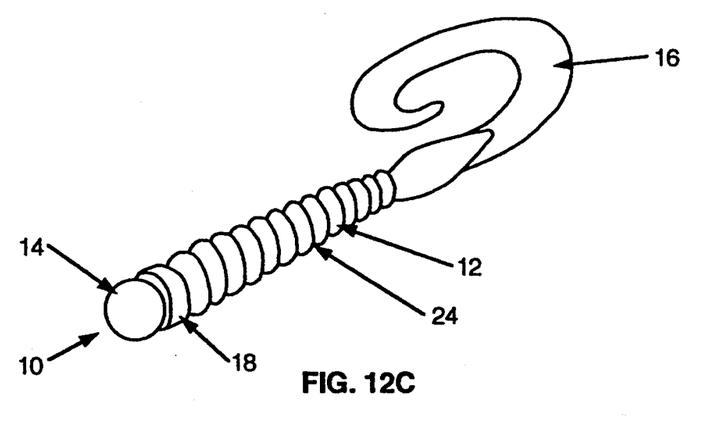
Figure 13A:
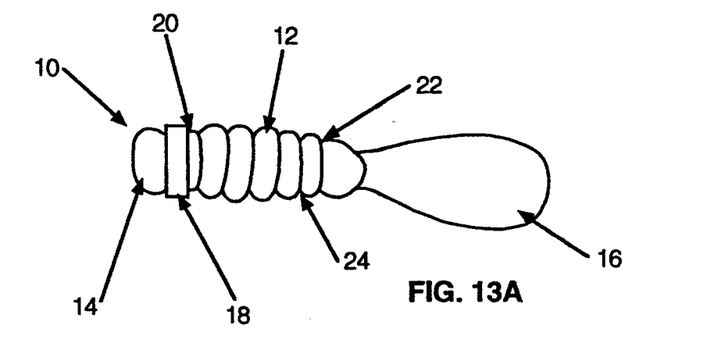
FIGS. 13a-13c are various views of a fishing lure according to the present invention formed as a soft plastic paddle tail.
Figure 13B:
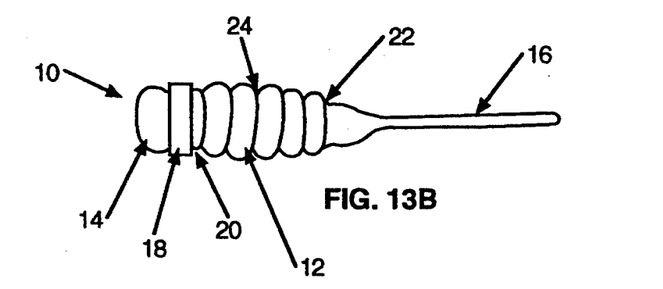
Figure 13C:
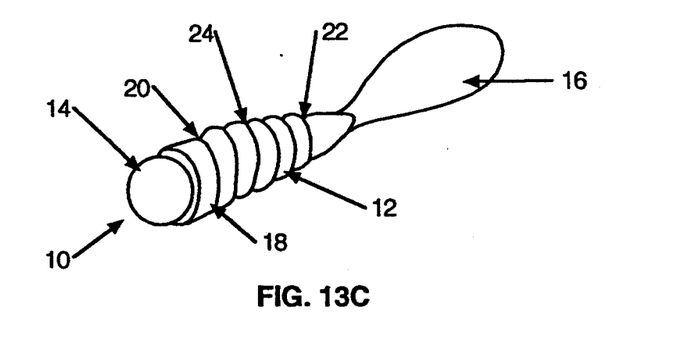

The tail 16 is realistically shaped to correspond with the body 12 of the fishing lure 10. For example, the tail can be curved for a worm appearance (FIGS. 1 and 3) or be a plurality of thin plastic strips for a squid appearance (FIG. 8). The tail adds stability to the fishing lure as the lure is pulled through a body of water.

The soft pliable plastic used to construct the body 12 of the fishing lure 10 is also used for constructing the tail 16. This plastic can be molded in a variety of colors, such as the ones listed for the body. The color used for the tail can be different from the color used for the body. For example, the body can be yellow and the tail can be chartreuse. Further, a plurality of metal flakes can be embedded in the tail. For example the body and tail can be gold and a plurality of metal flakes can be imbedded within the body and tail. Additionally, if metal flakes are embedded within the body then the tail need not have metal flakes. For example, the body can be clear with metal flakes and the tail can be red without metal flakes.

Located in the head 14 is a guide hole 26. The guide hole 26 extend from the head to the front portion of the body. The head 14, like the body, is made from a soft pliable plastic that can be fabricated in a variety of colors, such as the ones listed for the body. The head will be the same color as the body.

Located between the head and body is a locking collar 18. This locking collar 18 secures and maintains a jighead (illustrated in FIGS. 16a and 16b) within the fishing lure 10.

The locking collar 18 of the present invention is a hollow circular plastic tube. The collar is placed on the fishing lure 10 between the head 14 and body 12 and encircles the fishing lure 10. The diameter of the locking collar is smaller than the diameter of the head and body.

Placement of the locking collar 18 on the fishing lure is accomplished by first heating the locking collar. This will soften the plastic. Once heated, the collar is flared out with a plier-like device. The head of the fishing lure is then inserted into the locking collar and the plier-like device is removed. The locking collar is shrink-fitted and contrasted down onto the fishing lure. Through this method the locking collar fits snugly around the fishing lure.

Figure 16A:
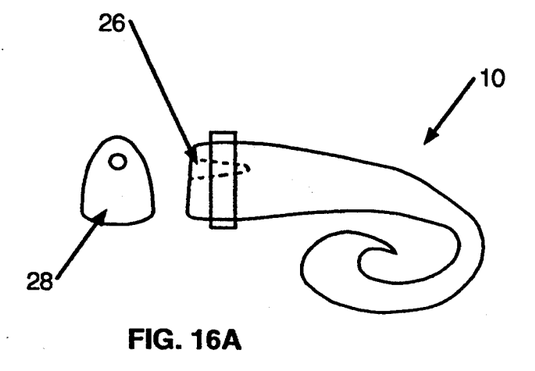
FIG. 16a is a view of a fishing lure of the present invention illustrating the guide hole in which jighead will be inserted.
Figure 16B:
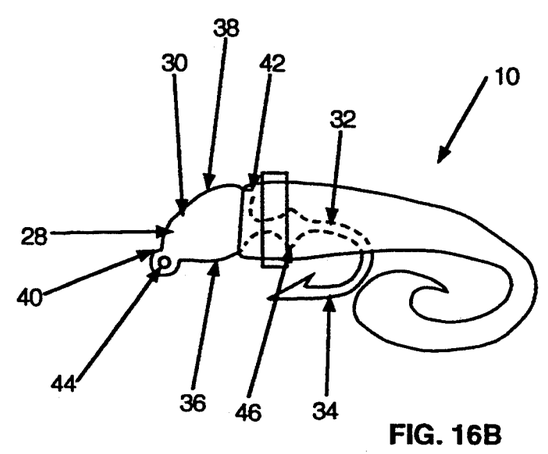
FIG. 16b is a view of a fishing lure of the present invention illustrating a jighead insert into the guide hole of the fishing lure.

A jighead is inserted into the guide hole of the head of the fishing lure. The jighead is illustrated in figures 16a and 16b. As seen in these figures, the jighead 28 consists of a lead head 30, a plastic shank 32 and a hook 34. The lead head 30 has a flat planar upper area 36, a rounded lower area 38, a front portion 40, and a back portion 42. Attached to the front portion 40 at the flat planar upper area 36 of the lead head 30 is an eyelet 44. Centrally affixed to the back portion 42 of the lead head 30 is the plastic shank 32. The eyelet, lead head, and shank form a homogeneous object.

The shank has a first end and a second end. The first end of the plastic shank is attach to the back portion of the lead head. A locking tab 46 is affixed to the second end of the plastic shank. This locking tab 46 has a larger diameter than that of the locking collar. The shank has a smaller diameter than that of the locking tab. Secured to the locking tab is a hook 34.

The lead head and shank can be molded into a variety of colors, such as, but not limited to, red, white, green, and yellow.

In order to utilize a fishing lure of the present invention, the hook of the jighead is inserted into the guide hole of the head of the fishing lure. The hook goes through the guide hole and pierces the top area of the body of the fishing lure. The jighead is inserted until half of the hook protrudes from the top area of the body of the fishing lure.

During the process of inserting the hook, the second end of the shank passes the locking collar. As stated previously, the locking tab is located at the second end of the shank. The locking tab of the jighead has a larger diameter than the locking collar. During the insertion process, the locking tab forces expansion of the locking collar. Once the locking tab passes the locking collar, the locking collar retracts to its original size. The jighead is securely fastened within the body of the fishing lure. The locking collar and locking tab prevent the body of the fishing lure to slip down the hook.

It is noted that the shape and design of the fishing lures of the present invention are not limited to the shapes and designs illustrated in FIGS. 1-15. The fishing lures of the present invention can include several further shapes and designs such as, but not limited to; lizards, worms, pork rind baits, crayfish, and eels.

While the invention has been particularly shown and described with reference to an embodiment thereof, it will be understood by those skilled in the art that various changes in form and detail may be made without departing from the spirit and scope of the invention.

I claim:

1. A fishing lure in combination with a jighead having a hook with a locking tab, the lure comprising:
    a head, a body, and a tail;
        said head has a first diameter;
        said body has a second diameter;
        said body has a front portion and a back portion;
            said head is attached to said front portion of said body;
            said tail is attached to said back portion of said body;
    a locking collar;
        said locking collar is a hollow circular plastic tube;
        said locking collar has a third diameter;
            said third diameter is smaller than said first diameter and said second diameter;
            said locking collar is shrink-fitted and contrasted down between said head and said front portion of said body;
    a guide hole;
        said guide hole extends from said head to said front portion of said body;
        said guide hole has a first end that is opened that is located at said head and a second end located in said front portion of said body;
        said guide hole receives and guides said hook of said jighead and said hook extends through said guide hole and passes said second end of said guide hole and pierces said top area of said body of said fishing lure, said hook protrudes from said top area of said body of said fishing lure; and said locking tab of said jighead extends into said front portion of said body for providing said locking tab is located in said guide hole and circumferentially surrounded by said locking collar to securely lock said jighead and to prevent linear movement of said jighead in said body within said fishing lure.

2. A fishing lure in combination with a jighead as in claim 1 wherein said head, said body, and said tail are fabricated from soft plastic.

3. A fishing lure in combination with a jighead as in claim 2 wherein said head, said body, and said tail are embedded with metal flakes.

4. A fishing lure in combination with a jighead as in claim 1 wherein said body includes a plurality of ridges.

5. A fishing lure in combination with a jighead as in claim 1 wherein said tail includes a plurality of plastic strips.

* * * * *